US007692823B2

(12) United States Patent
Minowa et al.

(10) Patent No.: US 7,692,823 B2
(45) Date of Patent: Apr. 6, 2010

(54) IMAGE READING APPARATUS AND CONTROL METHOD THEREFOR

(75) Inventors: Kazuhiko Minowa, Saitama (JP); Eiji Shimoichi, Saitama (JP); Kouji Yorimoto, Saitama (JP); Hideaki Sugimoto, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 975 days.

(21) Appl. No.: 11/446,150

(22) Filed: Jun. 5, 2006

(65) Prior Publication Data

US 2007/0121127 A1 May 31, 2007

(30) Foreign Application Priority Data

Nov. 25, 2005 (JP) ............................. 2005-340968

(51) Int. Cl.
*H04N 1/04* (2006.01)
(52) U.S. Cl. ...................................... 358/474; 358/498
(58) Field of Classification Search ................. 358/474, 358/475, 505, 501, 496, 497, 498, 443, 527, 358/400, 401, 408, 448, 452, 468, 1.16, 1.9; 355/407, 408, 47, 48; 271/3.08, 3.14, 3.18, 271/8.1; 382/295, 296, 297, 298, 312, 318; 345/418, 629
See application file for complete search history.

(56) References Cited

U.S. PATENT DOCUMENTS 5,513,017 A * 4/1996 Knodt et al. ................. 358/471

| 6,535,298 | B2 * | 3/2003 | Winter et al. .............. 358/1.16 |
|---|---|---|---|
| 6,686,930 | B2 * | 2/2004 | Powers et al. ............... 715/724 |
| 7,110,152 | B2 * | 9/2006 | Johnston et al. ............. 358/538 |
| 7,379,930 | B2 * | 5/2008 | Kasatani ......................... 707/3 |
| 7,430,059 | B2 * | 9/2008 | Rodrigues et al. ............ 358/1.9 |
| 7,573,615 | B2 * | 8/2009 | Kasatani ..................... 358/402 |
| 7,577,662 | B2 * | 8/2009 | Kasatani ..................... 707/10 |
| 2005/0111053 | A1 | 5/2005 | Yoshida et al. |

FOREIGN PATENT DOCUMENTS

| CN | 1619438 A | 5/2005 |
|---|---|---|
| JP | A-2000-113180 | 4/2000 |
| JP | A-2002-247305 | 8/2002 |

* cited by examiner

*Primary Examiner*—Jerome Grant, II
(74) *Attorney, Agent, or Firm*—Oliff & Berridge, PLC

(57) ABSTRACT

An image reading apparatus having an automatic original document feeding apparatus that sequentially feeds plural original documents, which includes an original document reading section that reads an original document fed by the automatic original document feeding apparatus, an image data generation section that, on the basis of a reading output from the original document reading section, generates real image data and preview image data corresponding to the original document, and a display that, on the basis of the preview image data generated by the image data generation section, displays a preview image corresponding to the original document.

16 Claims, 6 Drawing Sheets

IMAGE READING APPARATUS AND CONTROL METHOD THEREFOR

BACKGROUND OF THE INVENTION

1. Field of the Invention

The present invention relates to an image reading apparatus having an automatic original document feeding apparatus that performs continuous reading of original documents, and a control method therefor, and particularly relates to an image reading apparatus which, in reading an original document using the automatic original document feeding apparatus, implements preview display, and allows image data on the basis of the content of the preview display to be efficiently formed, and a control method therefor.

2. Description of the Related Art

Generally, with the image reading apparatus as typified by the scanner, an original document as the object of image reading is placed on the platen, and the reading start pushbutton is depressed, which causes the reading head to be moved for carrying out original document reading. In addition, the feature of continuously reading plural original documents is implemented by loading an ADF, which sequentially feeds original documents to allow continuous reading.

In original document reading as mentioned above, the TWAIN (Technology Without Any Interested Name) feature, which allows reading to be started by controlling the scanner from the application, is available, and by providing a driver compatible with this TWAIN feature, an instruction for starting original document reading can be issued from a host computer connected to the scanner, for example, a PC.

The scanner which is compatible with this TWAIN feature is also equipped with the preview display feature, which is capable of preview-displaying the read original document on the host computer, and the user can verify the condition of the read original document by preview-displaying it on the host computer, and thus can form image data as desired.

As a related art with which, in such preview displaying, the image data formed by reading the original document can be transferred to a desired application, that as disclosed in the Japanese Patent Application Laid-Open No. 2000-113180 is available.

With the related art as disclosed in this Japanese Patent Application Laid-Open No. 2000-113180, the selected region of a document within the preview scan is clicked, being dragged to the open application or the desk top, for starting the optimized final scan of the selected region. This is implemented by displaying a preview image for preview display before the optimized final scan being performed.

In addition, as a related art with which prescan data is acquired by one time of reading operation for allowing a particular image processing method to be specified, and by using the specified image processing method, image data accommodating the finally required image processing for the prescan data can be obtained, that as disclosed in the Japanese Patent Application Laid-Open No. 2002-247305 is available.

With the related art as disclosed in this Japanese Patent Application Laid-Open No. 2002-247305, the reading apparatus for original document reading reads a particular original document in a prescribed location, and in addition, carries out reading of the original document in other different locations, then for the pieces of image data for the original document read in the different locations, a prescribed thinning-out processing is performed before prescan data being generated for storage. And, when image processing is specified for the prescan data, the image processing is performed for the stored prescan data for generation of image data which accommodates the image processing for the prescan data.

However, with the related art as given in the Japanese Patent Application Laid-Open NO. 2000-113180, preview image data to be dragged to the open application or the desk top is generated for carrying out the optimized final scan, which involves generating a preview image for preview display before carrying out the final scan to newly generate image data, resulting in much time being required until real image data is generated after verifying the content of the preview display, which presents a problem that the working efficiency is lowered.

In addition, with the related art as given in the Japanese Patent Application Laid-Open No. 2002-247305, the reading apparatus for original document reading reads a particular original document in a prescribed location, and in addition, carries out reading of the original document in other different locations, which results in two times of reading processing being required, and thus the reading processing requires extremely much processing time, as compared to the ordinary image processing, which presents a problem that the overall working efficiency for the processing is reduced. In addition, in order to accommodating the image processing performed for the prescan data, the storage region for storing the image data and the working region for performing the image processing are required.

SUMMARY OF THE INVENTION

Then, the present invention has been made in view of the above circumstances and provides an image formation apparatus and a method therefore which are adapted to be able to efficiently generate real image data accommodating the image processing provided for the image data preview displayed.

An aspect of the invention provides an image reading apparatus having an automatic original document feeding apparatus that sequentially feeds plural original documents, which includes an original document reading section that reads an original document fed by the automatic original document feeding apparatus, an image data generation section that, on the basis of a reading output from the original document reading section, generates real image data and preview image data corresponding to the original document, and a display that, on the basis of the preview image data generated by the image data generation section, displays a preview image corresponding to the original document.

BRIEF DESCRIPTION OF THE DRAWINGS

An embodiment of the present invention will be described in detail based on the following figures, wherein.

DETAILED DESCRIPTION OF THE INVENTION

Hereinbelow, one embodiment of the image reading apparatus and the control method therefor pertaining to the present invention will be described in detail with reference to the attached drawings.

In the embodiment as given below, the scanner is quoted as a typical example of the image reading apparatus pertaining to the present invention, however, the image reading apparatus pertaining to the present invention is not limited to the scanner, but it is applicable to such apparatuses as a facsimile, and the like.

EMBODIMENT

Figure 1:
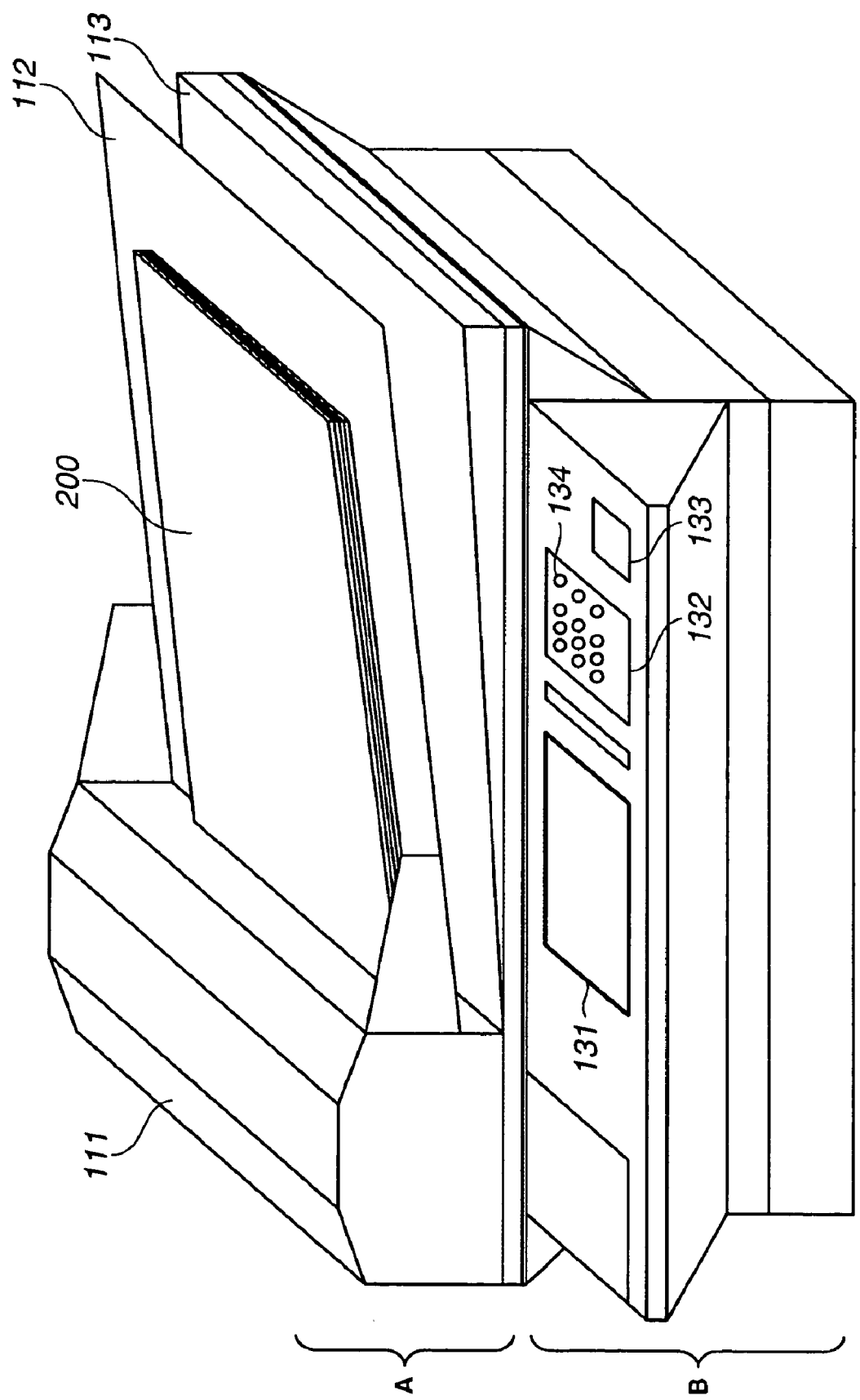
FIG. 1 is an external view of an apparatus configured by applying the image reading apparatus and the control method therefor pertaining to the present invention.

FIG. 1 is an external view of an apparatus configured by applying the image reading apparatus and the control method therefor pertaining to the present invention.

In FIG. 1, a scanner 100 is configured to comprise an ADF (Auto Document Feeder) 111, which automatically feeds original documents 200 one by one to allow continuous reading; a feed-in tray 112 where the original documents 200 are to be set; a feed-out tray 113 to which each original document 200 which has been read is to be delivered; a touch panel 131 with which the user sets the reading conditions, or performs preview display; an operation pushbutton panel 132 for giving a reading instruction and performing data inputting; and a start pushbutton 133 for instructing the start of reading the original documents 200 set on the feed-in tray 112.

In addition, the portion including the ADF 111, the feed-in tray 112, and the feed-out tray 113 (the portion A in FIG. 1) can be lifted as a unit, and a platen for performing reading the original documents one by one is also provided between the portion A and the other portion (the portion B in FIG. 1).

After the original document 200 to be read are set on the feed-in tray 112, and the user sets the reading conditions using the touch panel 131, depressing the start pushbutton 133 will start reading. At the time of setting the reading conditions, whether the feature of preview-displaying the image data of original documents is to be enabled or disabled can be determined, and when enabling the feature is selected, preview display of the image data is performed for each unit number of original documents read.

This "unit number of original documents read" refers to the number of original documents read by one time of original document reading, and preview images are displayed on the touch panel 131 by the number of original documents which have been read.

As the default value of the unit number of original documents read, "1" is set, which indicates that preview display is performed for each original document. By changing the value of the unit number of original documents read, the number of original documents to be read at a time can be altered, and the number of preview images to be displayed at a time can be changed.

Figure 3A:
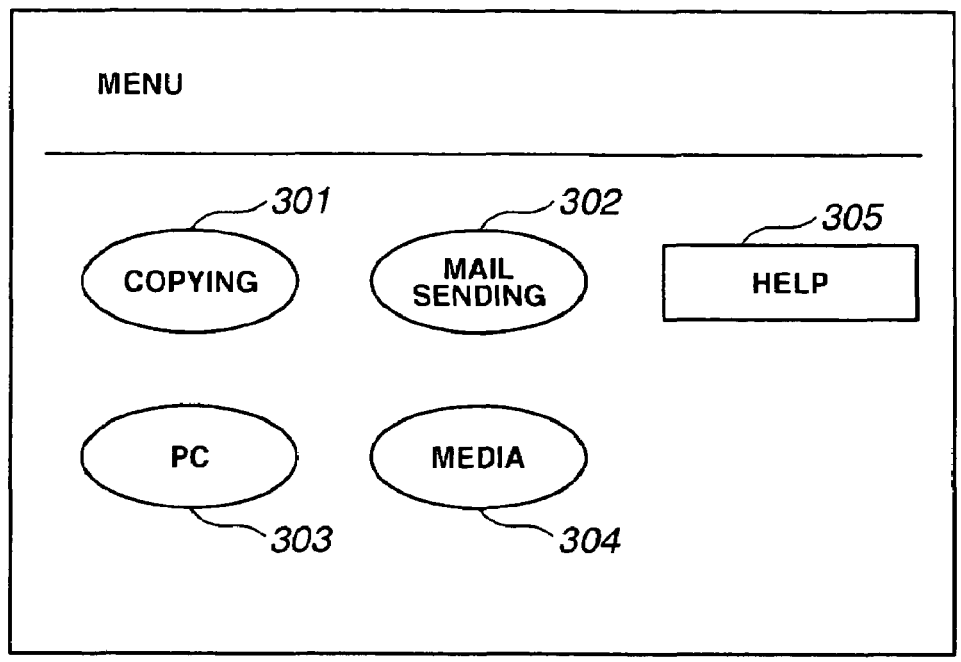
FIG. 3A and FIG. 3B are drawings illustrating the initial screen and the setting screen which are displayed on the touch panel in the scanner.

The initial screen which is displayed on the touch panel 131 in reading the original documents is a screen as shown in FIG. 3A, which indicates a list of the features which can be implemented by the scanner 100. This example of initial screen as shown in FIG. 3A indicates that the copying feature 301, the mail sending feature 302, the PC saving feature 303, and the media saving feature 304 are provided.

In order to implement the copying feature 301, it is necessary that the scanner 100 be connected to a printer, while, in order to implement the mail sending feature 302, connection to the network is required. Further, in order to implement the PC saving feature 303 or the media saving feature 304, a PC or a media which is locally or net connected is provided, respectively.

When apparatuses necessary for implementing the respective features are connected respectively, selecting the copying feature 301, for example, will transfer the image data read by the scanner 100 to the printer for performing copying. In addition, selecting the mail sending feature 302 will send an electronic mail including the read image data as an attached file to the specified destination. Further, selecting the PC saving feature 303 will save the read image data in the connected PC, while selecting the media saving feature 304 will save the read image data in the connected media.

Depressing a help pushbutton 305 will display an explanation of features which can be implemented by operating the respective pushbuttons.

Figure 3B:
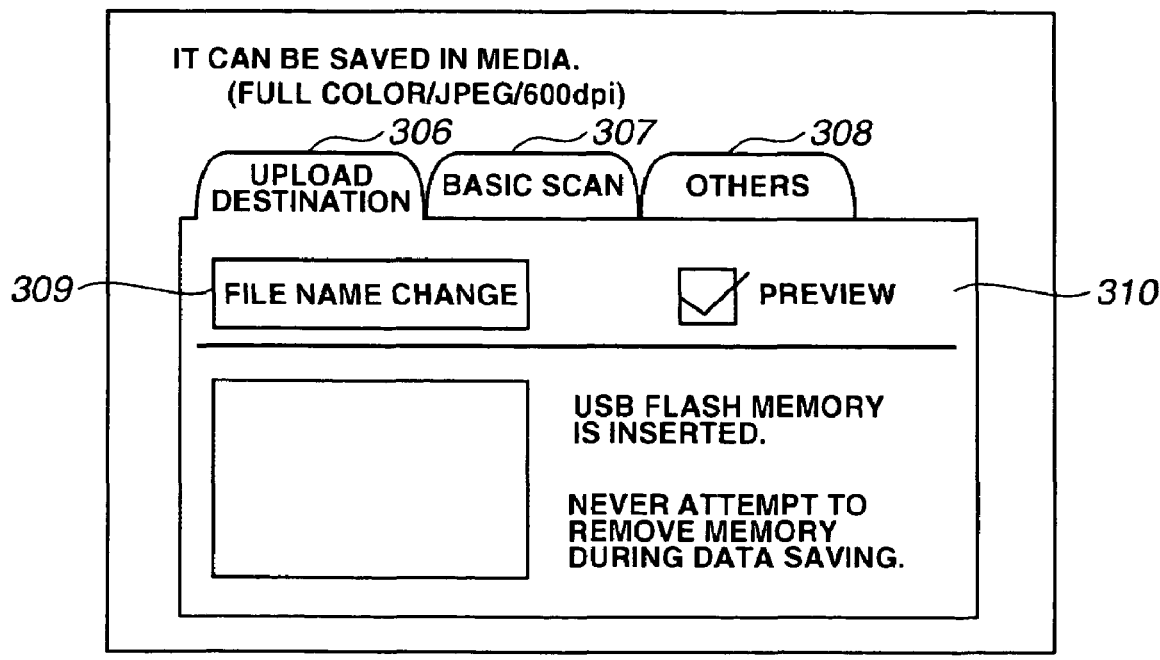

Next, from the initial screen, selecting any one of the features will then display a screen for setting the reading conditions as shown in FIG. 3B, for example. The screen as shown in FIG. 3B is that which is displayed when the media saving feature 304 is selected in FIG. 3A, and it is composed of three subscreens which are displayed by depressing an "saving destination" tab 306, a "basic scan" tab 307, and an "others" tab 308.

With the saving destination tab 306, the file name for the image data to be saved in the media specified as the saving destination can be specified or changed by using a "file name change" pushbutton 309, and whether the preview display for the image data is to be enabled or disabled can be determined by using a "preview display" pushbutton 310. After setting the conditions on the subscreens for the respective tabs, depressing the start pushbutton 133 will start the reading of the set original documents.

Figure 4A:
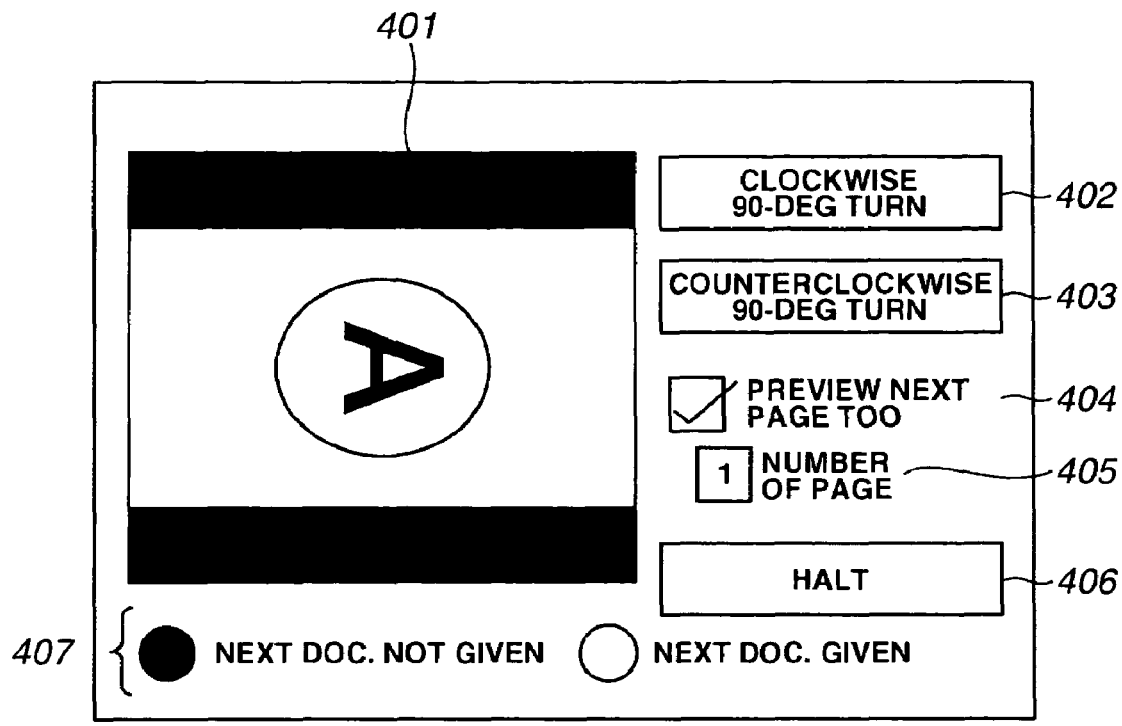
FIG. 4A and FIG. 4B are example drawings of the touch panel which is giving a preview display.
Figure 4B:
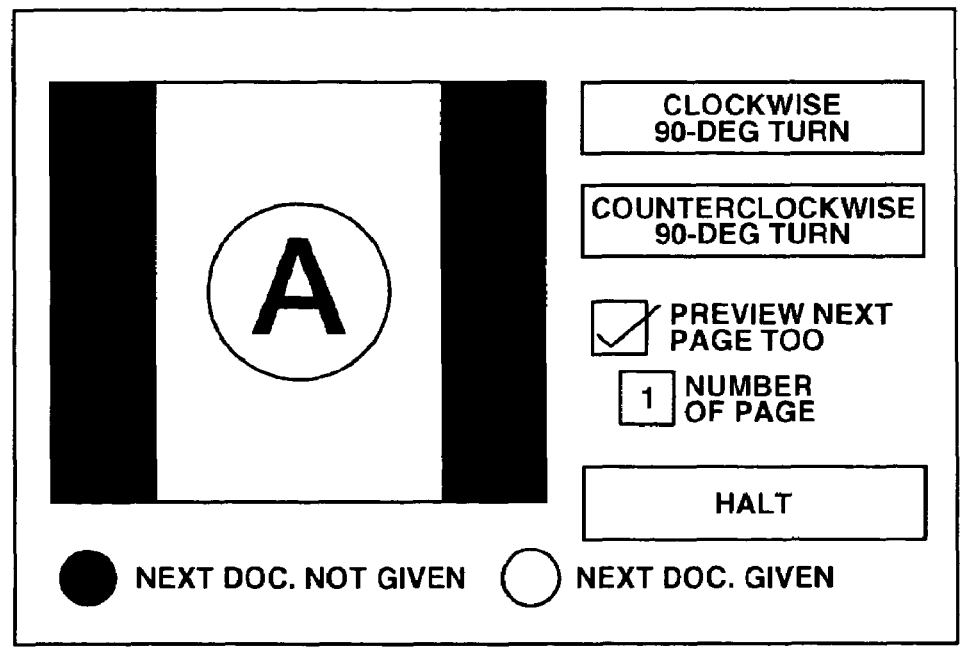

When the reading is carried out with the "preview display" pushbutton 310 being depressed (check marked), the preview image data for the original documents of each unit number of original documents read is displayed on the touch panel 131. FIG. 4A and FIG. 4B are example drawings of the preview display screen which is given at this time.

For the preview image data which has been preview-displayed, editing, such as turning, or the like, is performed, then in order to read the next original document, the start pushbutton 133 is again depressed. With the start pushbutton 133 being depressed, the next original document is fed by the ADF 111 for reading, and is preview-displayed in the same manner as with the preceding original document. When preview display is not to be performed at the time of the next reading, the check mark is removed from the next page preview check box on the preview display screen as shown in FIG. 4A or FIG. 4B, and the start pushbutton 133 is depressed.

On the screen as shown in FIG. 4A and FIG. 4B, processing for turning the image data is possible as an example of editing, however, the processing is not limited to turning, and alteration of the coloring, black and white inversion, and other types of processing can be performed.

In addition, on the operation pushbutton panel 132, a preview resumption pushbutton 134 is provided, and even when an original document is being read with the preview display feature being disabled, depressing the preview resumption pushbutton 134 will allow the preview display to be resumed on the way.

With such a configuration, original documents read can be preview-displayed by the prescribed unit number of original documents read, and for each of the original documents read, turning or other processing can be performed.

Figure 2:
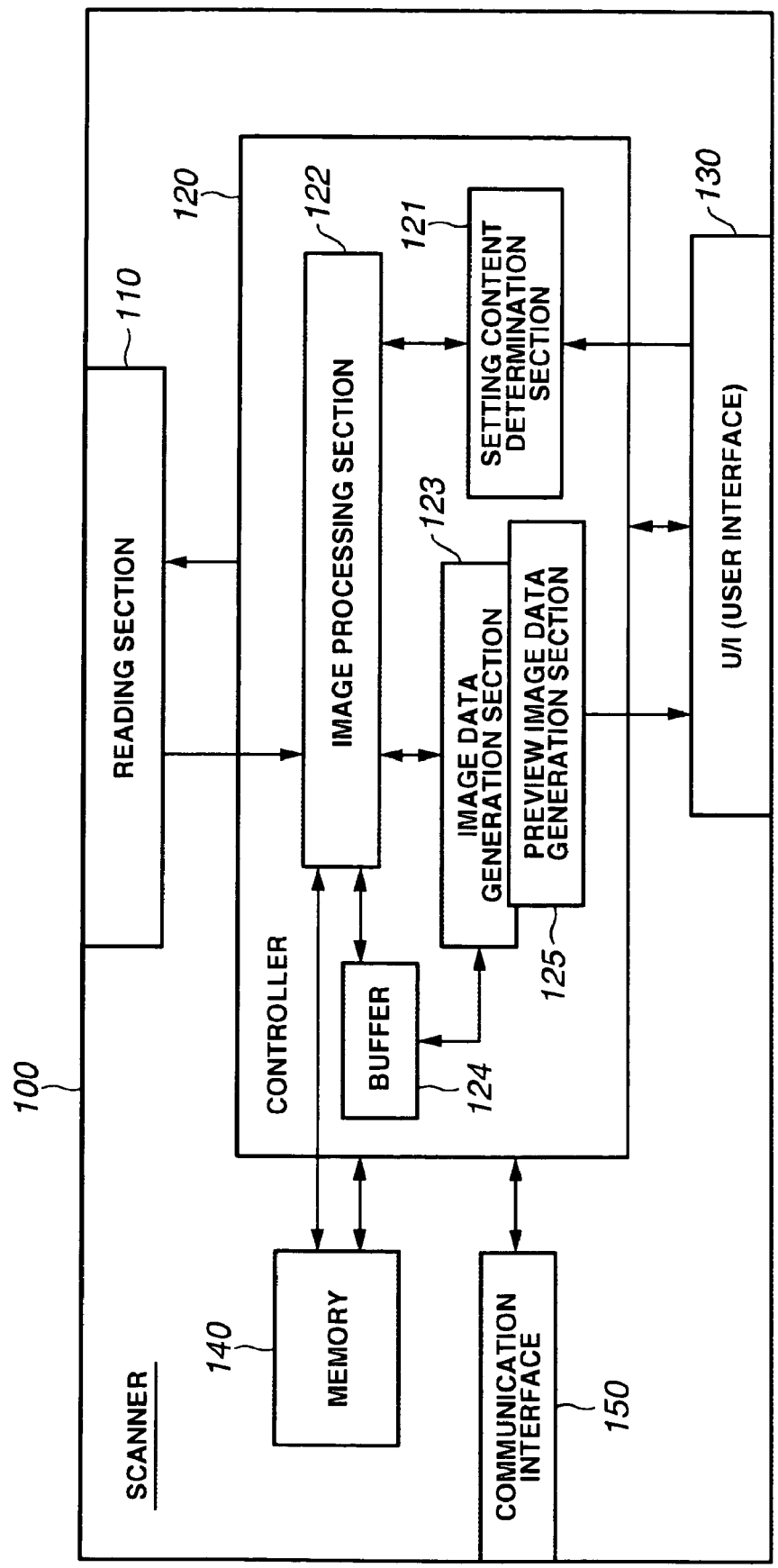
FIG. 2 is a block diagram illustrating the apparatus configuration of the image reading apparatus of the present invention.

FIG. 2 is a block diagram illustrating the apparatus configuration of the image reading apparatus of the present invention.

In FIG. 2, the scanner 100 is configured to comprise a reading section 110, a controller 120, a U/I 130, a memory 140, and a communication interface 150, the original documents set in the reading section 110 being sequentially read.

The reading section 110 is configured to, as shown in FIG. 1, comprise the ADF 111, the feed-in tray 112, and the feed-out tray 113, and the U/I (User Interface) 130 is configured to, as shown in FIG. 1, comprise the touch panel 131, the operation pushbutton panel 132, and the start pushbutton 133.

The reading section 110 is composed of a reading apparatus including such a feeding system as an ADF, which can sequentially feed plural original documents for continuous reading, and on the basis of an instruction from the controller 120, carries out reading of the original documents set. The image data for the read original document is transferred to an image processing section 122 of the controller 120 for processing.

The controller 120 provides a main controller of the scanner 100, performing image processing in generation of the image data for an original document. When the controller 120 receives an original document reading instruction from the U/I 130, it acquires the unit number of original documents read that indicates the number of original documents to be read at one time of reading, from the memory 140, and gives a reading instruction to the reading section 110 together with the information of the unit number of original documents read. The unit number of original documents read at this time indicates the number of pieces of image data to be preview-displayed at the U/I 130, and when one piece of image data is to be displayed at one time of reading, "1" is set.

And, the controller 120 saves the image data for the original document which has been read, in the saving destination specified in the reading instruction. For example, when it is specified that the image data be saved in the scanner as the saving destination, the image data is saved in the memory 140. In addition, the image data may be saved in a storage apparatus connected through the communication interface 150, for example, a USB (Universal Serial Bus) flash memory, a PC (personal computer), or the like.

This controller 120 is configured to comprise a setting content determination section 121, the image processing section 122, and an image data generation section 123, and the image processing section 122 receives the data for the original document which has been read with a reading instruction being given to the reading section 110 from the controller 120.

The setting content determination section 121 receives the setting information which has been set by the user operating the U/I 130, and analyzes the contents of the setting information. At this time, the setting content determination section 121 not only discriminates the setting status of the preview display feature, i.e., enabled or disabled, that is included in the setting information, but also analyzes the contents for various setting items, such as the color or black and white coloring condition, the reading original document size, the reading direction, the density, and the like, for discrimination. The analyzed setting information is transferred to the image processing section 122 which performs image processing, being used for image processing of the image data for the original document read by the reading section 110.

In addition, when it is specified in the setting information that the preview display feature be enabled, and from the U/I 130, an instruction for turning the image data, or an instruction for altering the coloring condition, or the like, is given, the contents of the instruction are interpreted before being transferred to the image processing section 122.

The image processing section 122 gives an instruction for reading the original document to the reading section 110, and performs processing of the image data for the original document read by the reading section 110. The image data is temporarily stored in the buffer 124, and thereafter, on the basis of the setting status of the preview display feature, i.e., enabled or disabled, which has been given by using the U/I 130, the image processing section 122 gives an instruction for generating image data to the image data generation section 123.

When the preview display feature is enabled, the image processing section 122 gives an instruction for generating preview image data together with an instruction for generating real image data to the image data generation section 123, and the image data generation section 123 gives an instruction for generating preview image data to the preview image data generation section 125. Thereby, the image data stored in the buffer 124 is acquired, and real image data is generated by the image data generation section 123. In addition, by the preview image data generation section 125, preview image data is generated.

Needless to say, the system may be configured such that a generation instruction is directly given to the preview image data generation section 125 rather than given through the image data generation section 123. In this case, the image data generation section 123 and the preview image data generation section 125 concurrently perform the processing.

On the other hand, when the preview display feature is disabled, generation of preview image data by the preview image data generation section 125 is not performed, but only the generation of real image data by the image data generation section 123 is performed.

The real image data and the preview image data which have been generated when the preview display feature is enabled are stored in the buffer 124.

And, when, for the preview image data which has been preview-displayed, the user provides a verification processing by, for example, giving an instruction for starting the reading of the next original document, the real image data stored in the buffer 124 is saved in the saving destination specified. For example, when a USB flash memory is specified as the saving destination, the real image data is saved in the USB flash memory connected through the communication interface 150.

The system may be configured such that, at this time, when the format of the image data obtained by reading the original document by the reading section 110 is TIFF (Tagged Image File Format) or PDF (Portable Document Format), the image data is not turned, but the specification for orientation of the header part is changed, even if an instruction for turning has been given by the user with the use of the U/I 130.

The image data generation section 123 generates real image data for the original document by shaping the image data processed by the image processing section 122. The real image data provides image data, which is a digital image generated from the original document read, and the real image data generated is again transferred to the image processing section 122, being stored in the memory 140 by the image processing section 122.

In addition, this image data generation section 123 is configured to comprise the preview image data generation section 125, and according to a generation instruction from the image processing section 122, generates image data to be preview-displayed (to be called "preview image data"). The preview image data is generated together with a real image data generated by the image data generation section 123, being stored in the buffer 124 to be displayed on the U/I 130.

Preview image data generation instruction from the image processing section 122 is given by the image processing section 122 instructing the image data generation section 123 to provide preview display, when a turning instruction, or the like, given by the U/I 130 is analyzed by the setting content determination section 121 for interpretation, and on the basis of the discrimination, it has been specified that preview display be performed.

This preview image data generation section 125 generates preview image data on the basis of an editing instruction, such as a turning one, or the like, given by the user as a result of referencing the preview image data which is preview-displayed. And, when no change is given to the generated image, and the verification processing as mentioned above is performed, the image data generation section 123 generates real image data for the preview image data, which is saved in the specified saving destination.

The image data generation section 123 may be configured such that, every time an editing instruction is given for preview image data generated by the preview image data generation section 125, and new preview image data which accommodates the editing instruction is generated, it generates real image data on the basis of the editing instruction.

Further, the preview image data generation section 125 may be configured such that the preview image data generation section 125 generates preview image data turned to a turning angle which is previously specified. For example, if the previously specified turning angle is 90 deg, three pieces of image data, i.e., the image data turned 90-deg clockwise (270-deg counterclockwise), turned 180-deg clockwise (180-deg counterclockwise), and turned 270-deg clockwise (90-deg counterclockwise), are generated in addition to the original image data. In this case, no pieces of image data other than the image data which corresponds to the contents of the editing instruction are used.

The U/I 130 provides a user interface which accepts operations by the user, being configured to comprise a display composed of a display, and the like; and an operation section composed of a keyboard, a pointing device, and the like. A part of FIG. 1 shows an example of U/I 130 which integrates these display and operation section.

With the U/I 130, an instruction for starting the reading of the original documents set in the reading section 110 is given, and the reading conditions and the saving destination pertaining to the reading are set. The reading conditions which can be set include the enabled/disabled status of the preview display feature, the color or black and white coloring condition, the reading original document size, the reading direction, the density, and the like. In addition, as the saving destination, a storage medium, such as a USB flash memory connected through the communication interface 150, a PC, or the like, can be specified besides the scanner.

After setting these conditions, when an instruction for starting reading the original documents is given by depressing the start pushbutton 133, or otherwise, that a reading instruction has been given is transferred from the U/I 130 to the controller 120, the reading conditions being transmitted to the setting content determination section 121 in the controller 120.

When, with the preview display feature being enabled as a reading condition, the original document is read by the reading section 110, and preview image data is displayed in the touch panel 131, a turning instruction, a coloring change instruction, and the like, can be given to the preview image data. The instructions given are transferred to the setting content determination section 121, and preview image data which has been regenerated by the preview image data generation section 125 is displayed. When a desired image data is generated, the user depresses the start pushbutton 133 to give an instruction for reading the next original document.

The memory 140 is composed of an ROM (Read Only Memory), an RAM (Random Access Memory), and the like, and stores a control program and various parameters for carrying out reading of original documents by the scanner 100, and a control program for performing preview display. These control program and parameters are read out from the controller 120 for implementation.

In addition, it stores information about unit number of original documents read. This unit number of original documents read provides information which indicates the number of original documents to be read by one time of original document reading when plural original documents are set in the ADF, and preview images are displayed on the touch panel 131 by the number of original documents which have been read.

For example, when one piece of original document is to be read at one time of reading, "1" is set as the information about unit number of original documents read. In addition, when "2" is set as the unit number of original documents read, two original documents are read, and then for the respective two original documents which have been read, preview images are concurrently displayed on the touch panel.

In this case, the user selects a preview image as the operation object using the touch panel, and makes an editing operation, such as turning, coloring change, or the like, on the selected preview image.

The unit number of original documents read can be rewritten with the controller 120.

The communication interface 150 provides an interface for connecting to external equipment, being composed of communication interfaces, such as a USB interface, a network interface, and the like. For example, a USB cable can be used for connection to a PC, and a LAN (Local Area Network) cable can be used for network connection. By providing a network connection to operate the scanner 100 as a node on the network, the electronic mail feature, the SNMP (Simple Network Management Protocol) feature, and the like can be implemented.

Further, when a USB flash memory is inserted, the USB flash memory can be selected from the U/I 130 as the saving destination for saving the image data. The storage apparatus to be used at this time is not limited to the USB flash memory, and various media can be used.

With such a configuration, not only the real image data obtained by reading an original document, but also preview image data for performing preview display can be concurrently generated. In addition, with the user instruction, it is capable of not only enabling or disabling the preview display feature, but also changing the disabled status of the preview display feature into the enabled one on the way.

FIG. 4A and FIG. 4B are example drawings of the touch panel which is giving a preview display.

In FIG. 4A and FIG. 4B, FIG. 4A is a drawing illustrating the set original document which is preview-displayed by reading, while FIG. 4B is a drawing illustrating the image data which has been turned through 90 deg in a counterclockwise direction from the state as shown in FIG. 4A before being preview-displayed again.

The components of the respective FIG. 4A and FIG. 4B are a preview display screen 401, a clockwise 90-deg turn pushbutton 402, a counterclockwise 90-deg turn pushbutton 403, a next page preview check box 404, the number of page 405, a halt pushbutton 406, and an original document condition indicator 407.

In order to turn the image data displayed on the preview display screen 401 through an angle of 90 deg in a clockwise direction, the clockwise 90-deg turn pushbutton 402 is depressed, while, in order to turn it at 90-deg counterclockwise, the counterclockwise 90-deg turn pushbutton 403 is depressed. By depressing one of these pushbuttons, the image data which is preview-displayed is changed in accordance with the content of the depressed pushbutton. When the check mark in the next page preview check box 404 is removed, the subsequent original documents are read without preview display being performed for continuous reading. When a check mark is given in the next page preview check box 404, preview display is performed also in reading the next original document.

The system may be adapted such that, when the reading is rendered continuous by changing the enabled status of the preview display feature into the disabled one on the way, an editing which has once set with the preview display feature being enabled, for example, an editing of turning the image data at an angle of 90 deg clockwise that has been given by depressing the clockwise 90-deg turn pushbutton 402 is applicable to all the subsequent pieces of image data.

The number of page 405 indicates the number of the read original document of the original documents to be read. The halt pushbutton 406 is a pushbutton for halting the reading, and the image data at the time when the halt pushbutton 406 is depressed is discarded.

The original document condition indicator 407 indicates whether or not the user adds another original document to be read, and when the original document condition indicator 407 is set at the item "next original document given", the original document added can be read continuously.

With such a screen, preview display can be performed, and an editing, such as turning, or the like, can be given to the image data which is preview-displayed.

Figure 5:
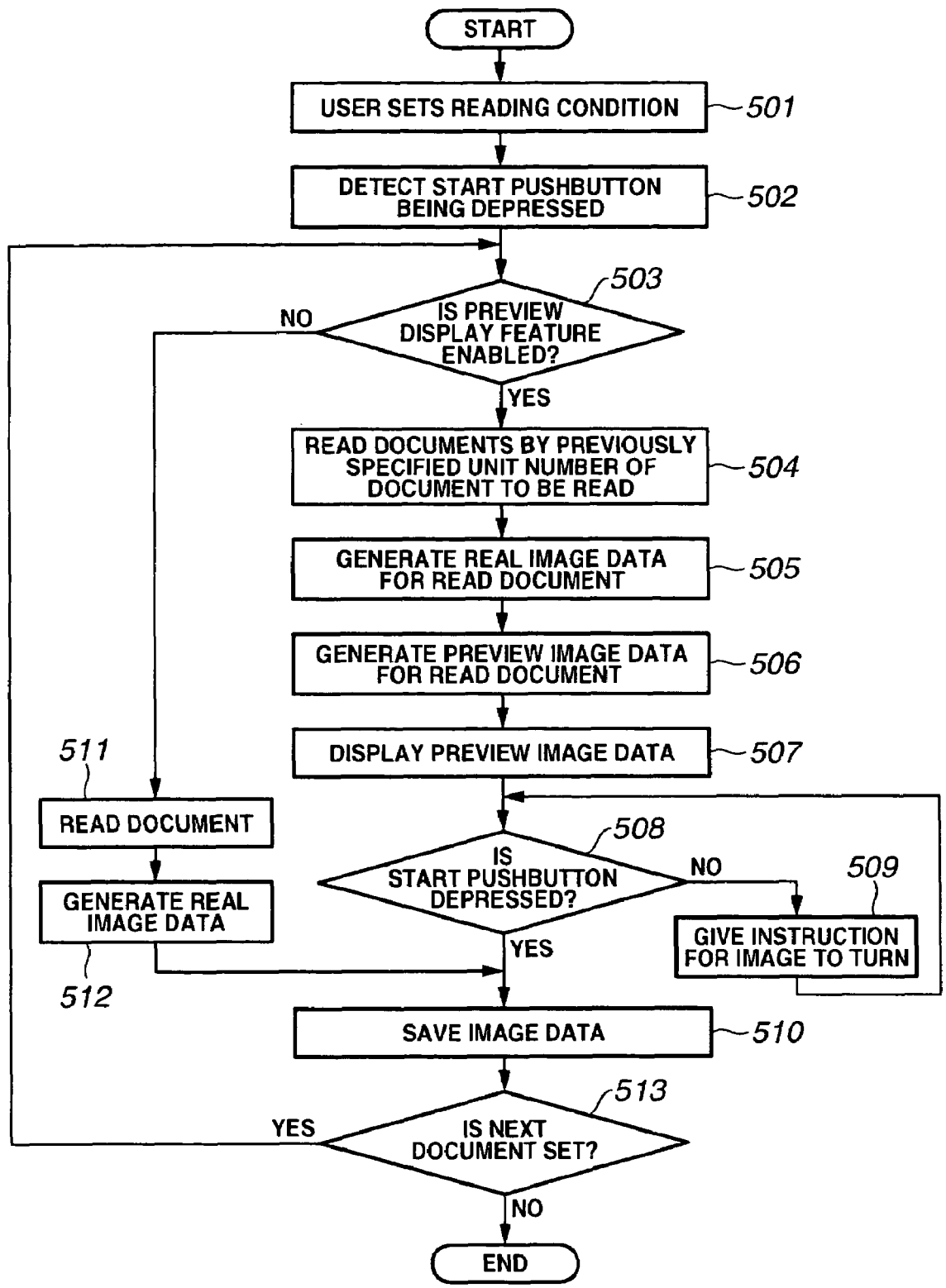
FIG. 5 is a flowchart illustrating the flow of processing in the present invention.

FIG. 5 is a flowchart illustrating the flow of processing in the present invention.

In FIG. 5, when the user sets the original documents to be read, after turning the scanner power on, the processing is started, and setting the reading conditions is performed by the user (at 501). In setting the reading conditions, the preview display feature can be enabled or disabled, and in addition, the reading resolution, the coloring condition, and the like can be set.

After the reading conditions having been thus set by the user, the start pushbutton being depressed by the user (at 502), whether the preview display feature is enabled or disabled is interpreted, among the reading conditions set by the user (at 503). When there is no need for preview displaying, ordinary original document reading can be continuously performed, however, if preview displaying is required, the processing pertaining to the preview display is performed.

When the preview display feature is enabled (YES at step 503), the information about unit number of original documents read, which indicates the number of original documents to be read at one time of reading, is first taken out, and the original documents set in the ADF are read by the unit number of original documents read (at 504). In the initial state, the unit number of original documents read is set at "1", thus one original document is read. If the unit number of original documents read is set at "2", two original documents are continuously read.

Then, for the original document, real image data is generated (at 505), and because preview display is to be given in this case, preview image data is also generated (at 506). This processing of generating preview image data is performed concurrently with the processing of generating the real image data.

When the unit number of original documents to read is set at "2", the real image data is generated for each (at 505), and the preview image data is generated for each (at 506).

And, the preview image data generated is preview-displayed on the touch panel (at 507). Herein, if the start pushbutton is depressed following the preview displaying, the depression instructs that the preview image data which has been preview-displayed be saved with no change given, while, if an instruction for turning, or the like, is given before the start pushbutton being depressed, it is required to depress the start pushbutton in order to actually give the change to the real image data from which the preview image data has been generated, and thus whether the start pushbutton has been depressed or not is discriminated (at 508).

With the start pushbutton being depressed (YES at step 508), the real image data for the preview image data which is preview-displayed is saved in the specified saving destination (510).

In addition, when an instruction (editing instruction) for turning the preview image data which is preview-displayed is given before the start pushbutton being depressed (NO at step 508), processing of turning the image data is performed on the basis of the content of the instruction (at 509). Thereafter, with the start pushbutton being depressed, the real image data for the preview image data which has been turned is saved in the specified saving destination (at 510).

On the other hand, when the preview display feature is disabled (NO at step 503), the original documents set are sequentially read (at 511). For the original documents read, image data is generated (512), and in this case, there is no need for preview displaying, thus the image data is sequentially stored (at 510). This processing is repeated by the number of the original document.

Regardless of whether the preview display feature is enabled or disabled, saving the real image data is followed by determined whether the next original document is set for being read (at 513). When it is set (YES at step 513), whether the preview display feature is enabled or disabled is again determined, and thereafter, the processing as described above is repeated.

Figure 6:
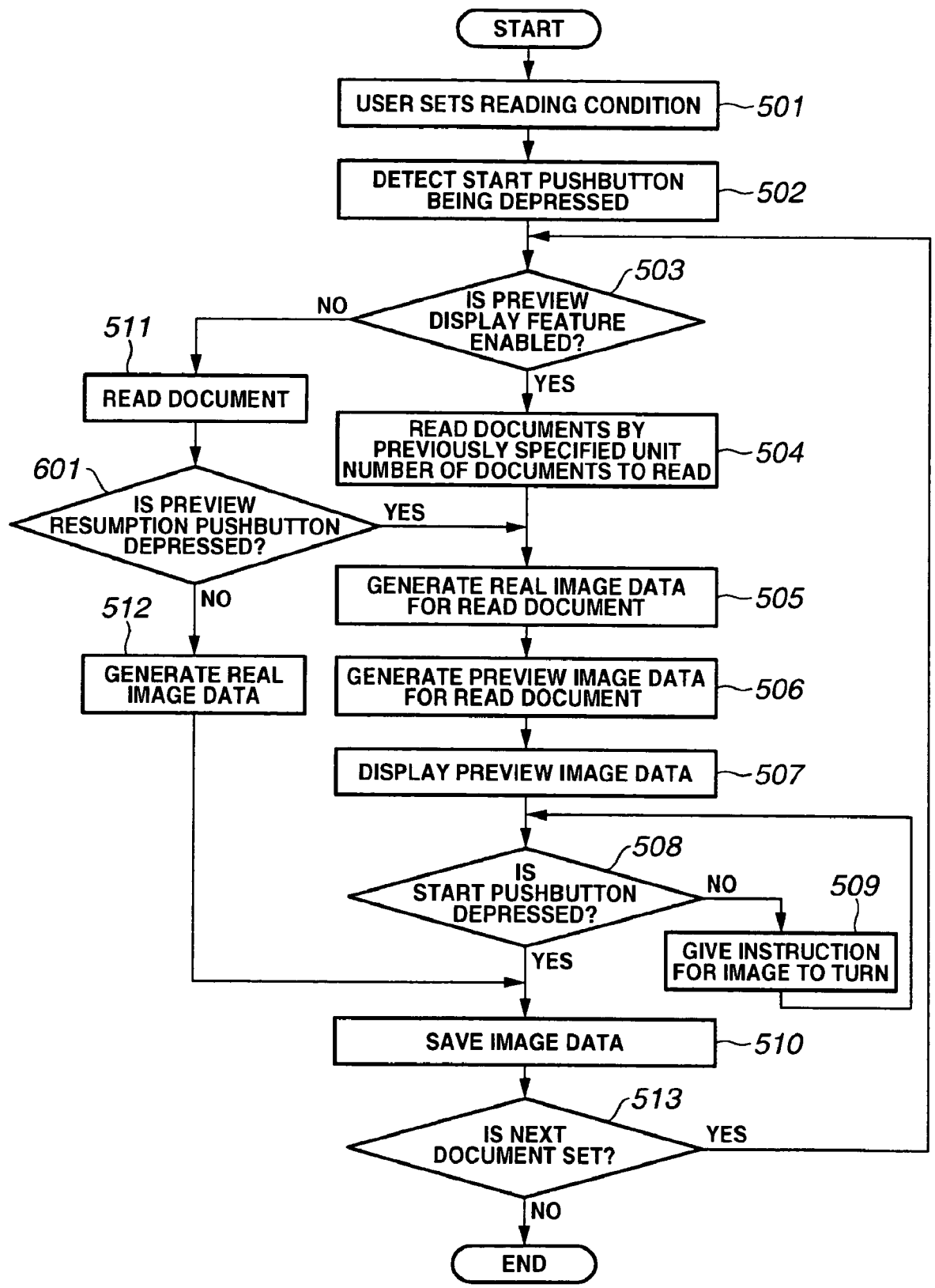
FIG. 6 is a flowchart illustrating the flow of processing that is similar to that in the flowchart as shown in FIG. 5.

FIG. 6 is a flowchart illustrating the flow of processing that is similar to that in the flowchart as shown in FIG. 5.

Because FIG. 6 is similar to FIG. 5, the different points will be mainly described.

In FIG. 6, the processing to be performed when the preview display feature is enabled is different from that in the flowchart as shown in FIG. 5, and FIG. 6 illustrates the processing which is provided when the preview display feature is determined to be disabled (NO at step 503), and the user depresses the preview resumption pushbutton (at 601), while original documents are being continuously read.

When the preview resumption pushbutton is depressed while the original document is being read (YES at step 601), the processing of generating real image data is performed in order to preview display the original document which is being read (at 505) in the same manner as when the preview display feature is enabled (YES at step 503). In order to preview display the original document which is being read, the resolution for the real image data which has been generated by the image data generation section 123 as shown in FIG. 2 is lowered by the preview image data generation section 125 for generation of preview image. Preview display can also be provided from the original document next to that which is being read, and in this case, generation of preview image data is performed concurrently with that of real image data (at step 506).

When the preview resumption pushbutton is not depressed (NO at step 601), the same processing as that which is indicated in FIG. 5 is performed.

By such a flow of processing, even if original document reading is performed with the preview display feature being disabled, preview display can be resumed.

As can be seen from the flowcharts as shown in FIG. 5, FIG. 6, when the preview display feature is enabled, preview display can be provided for each unit number of original documents read, and even when the preview display feature is disabled, preview display can be started on the way.

By the above-described processing, the scanner 100 of the present invention is capable of continuously reading plural original documents, and performing preview display of the image data for the original document which has been read. In this preview display, preview image data for preview display can be generated together with the real image data.

In addition, the user can determine whether the preview display feature is to be enabled or disabled, and can change over the setting status of the preview display feature, enabled or disabled.

Thereby, the user can preview display the original document which is to be verified, and even if the original document is in any location in the bundle of original documents, it can be preview-displayed for verification of the content.

Therefore, by applying the present invention, the image data as desired by the user can be generated by making a simple operation, and an effect that it is possible to generate efficient and optimum image data can be expected.

The present invention may be embodied with any alteration being given within the scope of the spirit thereof, being not limited to the embodiment as described above with reference to the attached drawings.

As described above, a first aspect of the invention provides an image reading apparatus having an automatic original document feeding apparatus that sequentially feeds plural original documents, which includes an original document reading section that reads an original document fed by the automatic original document feeding apparatus, an image data generation section that, on the basis of a reading output from the original document reading section, generates real image data and preview image data corresponding to the original document, and a display that, on the basis of the preview image data generated by the image data generation section, displays a preview image corresponding to the original document.

A second aspect of the invention provides the image reading apparatus of the first aspect of the invention, which may include an editing instruction section that, for the preview image displayed by the display, gives an instruction for editing, an editing section that, on the basis of the instruction for editing by the editing instruction section, edits the real image data generated by the image data generation section, and an image data output section that outputs the real image data edited by the editing section.

A third aspect of the invention provides the image reading apparatus of the second aspect of the invention, in which the image data generation section may generate, on the basis of the reading output of the original document reading section, plural pieces of preview image data that are different in turning angle, the editing instruction section may give an instruction for turning the preview image at a prescribed angle, the display may select, among plural pieces of preview image data, the preview image data corresponding to the prescribed turning angle instructed by the editing instruction section, and displays the selected preview image.

A fourth aspect of the invention provides the image reading apparatus of any one of the first to the third aspect of the invention, which may further include a selection section that determines whether a display of the preview image is to be enabled or disabled, in which, when disabling the display of the preview image is selected by the selection section, generation of the preview image by the image data generation section is not conducted, and ordinary original document reading is performed.

A fifth aspect of the invention provides the image reading apparatus of any one of the first to the third aspect of the invention, which may further include a selection section that determines whether a display of the preview image is to be enabled or disabled, wherein, when disabling the display of the preview image is selected by the selection section while plural original documents are being read by the original document reading section, generation of the preview image by the image data generation section is not conducted for a subsequent original document, reading of the original document is continued.

A sixth aspect of the invention provides the image reading apparatus of any one of the first to the third aspect of the invention, which may further include a selection section that determines whether a display of the preview image is to be enabled or disabled, wherein, when enabling the display of the preview image is selected by the selection section while plural original documents are being read by the original document reading section, generation of the preview image by the image data generation section is conducted for the subsequent original document.

A seventh aspect of the invention provides the image reading apparatus of the second or the third aspects of the invention, which may further include a selection section that determines whether a display of the preview image is to be enabled or disabled, wherein, when an instruction for editing is given by the editing instruction section, and disabling the display of the preview image is selected by the selection section while plural original documents are being read by the original document reading section, generation of the preview image by the image data generation section is not conducted for a subsequent original document and reading of the original document is continued, and the editing on the basis of the instruction for editing that is given by the editing instruction section is performed for the subsequent original document.

An eighth aspect of the invention provides a control method for image reading apparatus having an automatic original document feeding apparatus which sequentially feeds plural original documents, which include: reading, by an original document reading section, an original document fed by the automatic original document feeding apparatus; generating, by an image data generation section, on the basis of a reading output of the original document reading section, image data of a high resolution and preview image data of a low resolution corresponding to the original document; and displaying, by a display, on the basis of the preview image data generated by the image data generation section, a preview image corresponding to the original document.

A ninth aspect of the invention provides the control method for image reading apparatus of the eighth aspect of the invention, in which, when disabling a display of the preview image is selected while plural original documents are being, generation of the preview image by the image data generation section may not be performed for the subsequent original document, and reading of the original document may be continued.

A tenth aspect of the invention provides the control method for image reading apparatus of the eighth aspect of the invention, in which, when an instruction for editing is given by an editing instruction section and disabling a display of the preview image is selected by a selection section while plural original documents are being read by the original document reading section, generation of the preview image by the image data generation section may not be performed for the subsequent original document and reading of the original document may be continued, and editing on the basis of the instruction for editing that is given by the editing instruction section may be conducted for the subsequent original document.

The present invention provides an image reading apparatus having an automatic original document feeding apparatus with which the user can determine whether the preview display feature is to be enabled or disabled; when the preview display feature is enabled, preview image data is concurrently generated together with the real image data; image processing for the preview image data which has been preview-displayed can be accepted; and real image data which accommodates the content of the image processing is generated, thus the present invention provides an effect that it is possible to efficiently generate real image data desired.

In addition, the system is configured such that, with the image reading apparatus, image processing can be performed, thus even when image data is to be transferred to the host computer connected, there is no need for new image processing at the transfer destination, thus an effect that the working efficiency is improved is also provided.

Further, the system is also configured such that, when the preview display feature is disabled, continuous reading can be performed, and even when the preview display feature is disabled, the setting status can be changed into the enabled one while the original document is being read, thus the preview image for a particular original document can be verified, which provides an effect that the working efficiency is bettered.

The present invention is applicable to any image reading apparatus having an ADF, and particularly is useful for generating image data as desired by the user for plural original documents.

The foregoing description of the embodiment of the present invention has been provided for the purpose of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-340968 filed on Nov. 25, 2005 including specification, claims, drawings and abstract is incorporated herein by reference in its entirety.

What is claimed is:

1. An image reading apparatus having an automatic original document feeding apparatus that sequentially feeds a plurality of original documents, comprising:

an original document reading section that reads an original document fed by the automatic original document feeding apparatus, a selection section that, on the basis of a reading output from the original document reading section, determines whether a display of a preview image corresponding to the original document is to be enabled or disabled, an image data generation section that, when enabling the display of the preview image is determined in the selection section, on the basis of the reading output from the original document reading section, simultaneously generates, in parallel, both real image data and preview image data corresponding to the original document, a display that, on the basis of the preview image data generated by the image data generation section, displays a preview image corresponding to the original document, an editing instruction section that, for the preview image displayed by the display, gives an instruction for editing, an editing section that, on the basis of the instruction for editing by the editing instruction section, edits the real image data generated by the image data generation section, and an image data output section that outputs the real image data edited by the editing section.

2. The image reading apparatus of claim 1, wherein, when disabling the display of the preview image is selected by the selection section, generation of the preview image by the image data generation section is not conducted, and ordinary original document reading is performed.

3. The image reading apparatus of claim 1, wherein, when disabling the display of the preview image is selected by the selection section while a plurality of original documents are being read by the original document reading section, generation of the preview image by the image data generation section is not conducted for a subsequent original document, and reading of the original document is continued.

4. The image reading apparatus of claim 1, wherein, when enabling the display of the preview image is selected by the selection section while a plurality of original documents are being read by the original document reading section, generation of the preview image by the image data generation section is conducted for a subsequent original document.

5. The image reading apparatus of claim 1, wherein, when the instruction for editing is given by the editing instruction section, and disabling the display of the preview image is selected by the selection section while a plurality of original documents are being read by the original document reading section, generation of the preview image by the image data generation section is not conducted for a subsequent original document and reading of the original document is continued, and the editing on the basis of the instruction for editing that is given by the editing instruction section is performed for the subsequent original document.

6. The image reading apparatus of claim 1, wherein, when disabling the display of the preview image is selected by the selection section, generation of the preview image by the image data generation section is not conducted, and ordinary original document reading is performed.

7. The image reading apparatus of claim 1, wherein, when disabling the display of the preview image is selected by the selection section while a plurality of original documents are being read by the original document reading section, generation of the preview image by the image data generation section is not conducted for a subsequent original document, and reading of the original document is continued.

8. The image reading apparatus of claim 1, wherein, when enabling the display of the preview image is selected by the selection section while a plurality of original documents are being read by the original document reading section, generation of the preview image by the image data generation section is conducted for a subsequent original document.

9. The image reading apparatus of claim 1, wherein
the image data generation section generates, on the basis of the reading output of the original document reading section, a plurality of pieces of preview image data that are different in a turning angle,
the editing instruction section gives an instruction for turning the preview image at a prescribed turning angle,
the display selects, among the plurality of pieces of preview image data, the preview image data corresponding to the prescribed turning angle instructed by the editing instruction section, and displays the selected preview image.

10. The image reading apparatus of claim 9, wherein, when disabling the display of the preview image is selected by the selection section, generation of the preview image by the image data generation section is not conducted, and ordinary original document reading is performed.

11. The image reading apparatus of claim 9, wherein, when disabling the display of the preview image is selected by the selection section while a plurality of original documents are being read by the original document reading section, generation of the preview image by the image data generation section is not conducted for a subsequent original document, and reading of the original document is continued.

12. The image reading apparatus of claim 9, wherein, when enabling the display of the preview image is selected by the selection section while a plurality of original documents are being read by the original document reading section, generation of the preview image by the image data generation section is conducted for a subsequent original document.

13. The image reading apparatus of claim 9, wherein, when the instruction for editing is given by the editing instruction section, and disabling the display of the preview image is selected by the selection section while a plurality of original documents are being read by the original document reading section, generation of the preview image by the image data generation section is not conducted for a subsequent original document and reading of the original document is continued, and the editing on the basis of the instruction for editing that is given by the editing instruction section is performed for the subsequent original document.

14. A control method for image reading apparatus having an automatic original document feeding apparatus that sequentially feeds a plurality of original documents, comprising:
reading, by an original document reading section, an original document fed by the automatic original document feeding apparatus, determining, by a selection section at the time of reading, on the basis of a reading output from the original document reading section, whether a display of a preview image corresponding to the original document is to be enabled or disabled;
when enabling the display of the preview image is determined in the selection section. simultaneously generating in parallel, by an image data generation section, on the basis of the reading output of the original document by the original document reading section, image data of a high resolution and preview image data of a low resolution corresponding to the original document;
displaying, by a display, on the basis of the preview image data generated by the image data generation section, a preview image corresponding to the original document;
giving, by an editing instruction section, for the preview image displayed by the display, an instruction for editing;
editing, by an editing section, on the basis of the instruction for editing by the editing instruction section, the image data generated by the image data generation section; and
outputting, by an image data output section, the image data edited by the editing section.

15. The control method for image reading apparatus of claim 14, wherein, when disabling a display of the preview image is selected in the selection section while a plurality of original documents are being read, generation of the preview image by the image data generation section is not performed for a subsequent original document, and reading of the original document is continued.

16. The control method for image reading apparatus of claim 14, wherein, when an instruction for editing is given by an editing instruction section and disabling a display of the preview image is selected by the selection section while a plurality of original documents are being read by the original document reading section, generation of the preview image by the image data generation section is not performed for a subsequent original document and reading of the original document is continued, and editing on the basis of the instruction for editing that is given by the editing instruction section is conducted for the subsequent original document.

* * * * *